(12) United States Patent
Klepper et al.

(10) Patent No.: US 11,138,467 B2
(45) Date of Patent: Oct. 5, 2021

(54) METHOD, DEVICE, PRODUCT, AND COMPUTER PROGRAM FOR OPERATING A TECHNICAL SYSTEM

(71) Applicant: Robert Bosch GmbH, Stuttgart (DE)

(72) Inventors: Solveig Klepper, Kusterdingen (DE); Jan Biel, Schellerten (DE); Jan Hendrik Metzen, Boeblingen (DE)

(73) Assignee: Robert Bosch GmbH, Stuttgart (DE)

(*) Notice: Subject to any disclaimer, the term of this patent is extended or adjusted under 35 U.S.C. 154(b) by 272 days.

(21) Appl. No.: 16/375,441

(22) Filed: Apr. 4, 2019

(65) Prior Publication Data

US 2019/0325266 A1 Oct. 24, 2019

(30) Foreign Application Priority Data

Apr. 23, 2018 (DE) .......................... 102018206208.0

(51) Int. Cl.
*G06K 9/00* (2006.01)
*G06K 9/62* (2006.01)
*G06N 3/08* (2006.01)
*G06N 3/04* (2006.01)

(52) U.S. Cl.
CPC ......... *G06K 9/6256* (2013.01); *G06K 9/6262* (2013.01); *G06N 3/0445* (2013.01); *G06N 3/0454* (2013.01); *G06N 3/08* (2013.01)

(58) Field of Classification Search
CPC .. G06K 9/6256; G06K 9/6262; G06N 3/0445; G06N 3/0454; G06N 3/08
See application file for complete search history.

(56) References Cited

U.S. PATENT DOCUMENTS

| 5,285,523 A | 2/1994 | Takahashi |
| 10,766,137 B1* | 9/2020 | Porter ..................... B25J 9/161 |
| 2017/0200066 A1* | 7/2017 | Wang ....................... G06N 3/08 |
| 2017/0293837 A1 | 10/2017 | Cosatto et al. |
| 2017/0344829 A1* | 11/2017 | Lan ..................... G06K 9/00369 |
| 2018/0165547 A1* | 6/2018 | Huang ................. G06K 9/6232 |
| 2020/0167930 A1* | 5/2020 | Wang .................... G06T 7/0012 |

FOREIGN PATENT DOCUMENTS

| DE | 199 34 670 A1 | 12/2000 |
| DE | 102011087791 A1 | 6/2013 |

* cited by examiner

*Primary Examiner* — Shefali D Goradia
(74) *Attorney, Agent, or Firm* — Norton Rose Fulbright US LLP; Gerard Messina

(57) ABSTRACT

A method for operating e.g. a robot. The method includes the steps: acquiring a sequence of images of a space surrounding the robot within which a potential object is situated; ascertaining, using a first machine learning system, a respective first variable characterizing the potential object as a function of each of the images; ascertaining, using a second machine learning system, at least one second variable that characterizes the potential object as a function of a plurality of the first variables characterizing the potential object; controlling the robot as a function of the second variable characterizing the potential object. A computer program, a device for carrying out the method, and a machine-readable storage element on which the computer program is stored, are also described.

10 Claims, 3 Drawing Sheets

METHOD, DEVICE, PRODUCT, AND COMPUTER PROGRAM FOR OPERATING A TECHNICAL SYSTEM

CROSS REFERENCE

The present application claims the benefit under 35 U.S.C. § 119 of German Patent Application No. DE 102018206208.0 filed on Apr. 23, 2018, which is expressly incorporated herein by reference in its entirety.

FIELD

The present invention relates to a method, a device, and a product for operating a technical system using two machine learning systems. In addition, the present invention relates to a computer program and to a machine-readable storage element.

BACKGROUND INFORMATION

German Patent Application No. DE 10 2011 087 791 A1 describes a method in a maneuver assistance system in vehicles, as well as corresponding maneuver assistance systems. The method includes the steps: recognition of a situation in which a driver of the vehicle wishes to carry out a manual action in relation to an object, and support in the orientation of the vehicle in relation to the object.

German Patent Application No. DE 199 34 670 B4 described an object detection system made up of a combination of three object detectors.

SUMMARY

During operation of a deep neural network, used for example for a classification of images, lighting conditions or a perspective on a traffic scene may change greatly. This can have the result that during this change of a property of the surrounding environment, the deep neural network will incorrectly classify an object. In addition, the deep neural network may have been trained using an inadequately large quantity of training data, or incomplete training data, not containing all possible different perspective representations or illuminations of an object. As a result, objects may occasionally be incorrectly classified or detected. In contrast, an example method of the present independent may have the advantage that a further deep neural network is used that carries out a new classification as a function of the ascertained classifications of the deep neural network. For this purpose, the additional deep neural network contains additional information that can be present in distributed fashion along the classifications that were ascertained temporally previously. These temporally contained items of information enter into the new classification, which can increase the precision of the classification.

In a first aspect of the present invention, an example method is provided for operating a technical system, in particular a robot, an at least partly autonomous vehicle, a tool, or a machine tool.

Here it is advantageous that through the use of a plurality of ascertained first variables characterizing a potential object, additional information is provided to a second machine learning system, which information permits a more precise and more reliable characterization, for example a classification of the potential object. In addition, in this way misclassifications on the part of the first machine learning system are recognized, and, if warranted, are not taken into account for the operation of the technical system.

In the following, "potential object" is understood as meaning that an object has been detected, but it is not known whether it is an actual object situated in the space surrounding the technical system or an incorrectly detected object, for example a reflection or a ghost target. In addition, it is not known in which class or category of objects the potential object can be classified.

In addition, it is provided that the first machine learning system include a convolutional neural network, and that the second machine learning system include at least one recurrent neural network. The advantage here is that through the recurrent neural network, use may be made of items of temporal information characterizing the object that may be present along a sequence of images acquired temporally one after the other. This is because the recurrent neural network reuses intermediate variables ascertained temporally previously, and as a result items of information can be used that are temporally present in the first variables, ascertained temporally previously, that characterize the potential object. Because the recurrent neural network reuses its intermediate results, a higher degree of precision can be achieved in the characterization of the objects.

Alternatively, the second machine learning system can include a further deep neural network, in particular a fully meshed or convolutional neural network. The advantage of this alternative is that the temporal integration of the information from the sequence is here used by a further deep neural network to characterize the potential object. The temporally integrated information along first variables, ascertained previously, that characterize the potential object can be provided to the second machine learning system via a sorting of these variables according to a temporal sequence.

In addition, it is provided to ascertain a plurality of the second variables characterizing the potential object, and to ascertain a confidence level as a function of this plurality of second variables characterizing the potential object.

In the following, a "confidence level" is understood as a measure that indicates how reliable the variables characterizing the potential object are, e.g., for subsequent use for the classification of the potential object. This has the advantage that, as a function of the confidence level, it can be decided whether further first variables characterizing the potential object have to be ascertained in order to carry out a reliable classification of the potential object. In this way, for example a superfluous and computationally expensive further processing of images can be avoided.

In addition, it is provided that the first variables characterizing the potential object be ascertained as a function of a segment of the respective image. The segment contains the potential object and the segment can be scaled to a specifiable dimension. "Scaled" can be understood as meaning that the segment is interpolated to a larger segment, but also scaled down to a smaller segment.

An advantage here is that through the selective use of segments of the respective images, fewer input data are provided to the first machine learning system, thus achieving a reduction of the computationally expensive image processing. The scaling of the segments is advantageous because they are adapted to a standardized size so that the input of the first machine learning system does not have to be adapted to potential objects having different sizes in each case.

It can be provided to produce the segments as a function of a bounding box that encompasses the potential object, because these bounding boxes encompass the objects as precisely as possible and can be ascertained using further deep neural networks.

It can in addition be provided that the segments are produced as a function of at least one first variable characterizing the potential object. In addition, it can be provided that the bounding boxes are ascertained as a function of the variables characterizing the potential object. This has the advantage that the segment can be adapted in a targeted manner to the dimensions of the object.

In a second aspect of the present invention, a method is provided for training the machine learning systems. The machine learning systems are trained such that each of the first and second variables characterizing the potential object characterizes, in particular classifies, the potential object. Alternatively, the machine learning systems can be trained such that the control variable can be ascertained as a function of the second variable characterizing the potential object. In a further development of the second aspect, the machine learning systems can be trained independently of one another. In addition or alternatively, after the machine learning systems have been trained, the machine learning systems can be trained independently of one another.

"Training independently of one another" can be understood as meaning that the machine learning systems are trained separately from one another, so that parameters are adapted to each of the machine learning systems. Here, the parameters of the further machine learning system remain unchanged. "Training as a function of one another" can be understood as meaning that parameters of the machine learning systems are adapted as a function of one another or as a function of a cost function that is itself a function of the parameters of the machine learning systems.

In a further aspect of the present invention, a computer program is provided that is set up to carry out one of the methods named above, i.e., that includes instructions that cause a computer to carry out one of these named methods in all its steps when the computer program is run on the computer, and a machine-readable storage module is provided on which the computer program is stored. In addition, a device is provided, in particular the computer, that is set up to carry out one of the methods described herein.

Moreover, a product is provided in accordance with the present invention that is produced by carrying out the method according to the second aspect of the present invention.

Exemplary embodiments are shown in the figures and are explained in more detail below.

DETAILED DESCRIPTION OF EXAMPLE EMBODIMENTS

Figure 1:
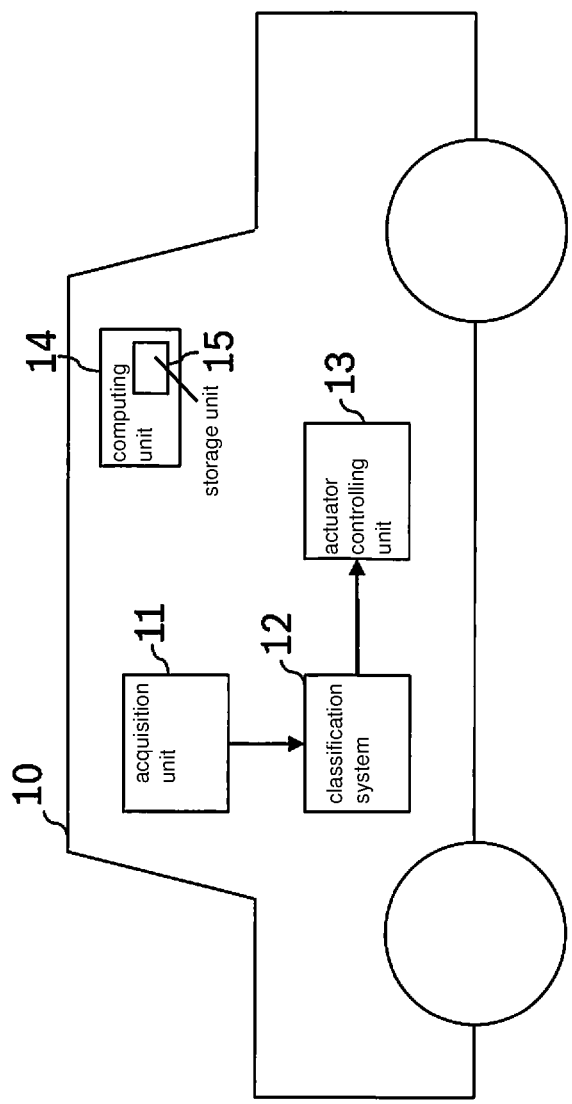
FIG. 1 shows a schematic representation of an at least partly autonomous vehicle.

FIG. 1 shows a schematic representation of an at least partly autonomous robot that, in the exemplary embodiment, is an at least partly autonomous vehicle (10). In a further exemplary embodiment, the at least partly autonomous robot may be a service robot, assembly robot, or stationary production robot. The at least partly autonomous vehicle (10) can include an acquisition unit (11). The acquisition unit (11) can for example be a camera that acquires a surrounding environment of the vehicle (10). The acquisition unit (11) can be connected to a classification system (12). As a function of an input variable, provided for example by the acquisition unit (11), the classification system (12) ascertains an output variable using at least two machine learning systems shown as examples in FIG. 2. The output variable can characterize a potential object that has been detected in the surrounding environment of the vehicle (10). For example, the classification system (12) can classify the potential object as a pedestrian or a bicyclist. In addition, the classification system (12) can also classify the potential object as "not an object" in order to reject incorrectly detected objects.

The output variable can be forwarded to an actuator controlling unit (13). The actuator controlling unit (13) can control an actuator, as a function of the output variable of the machine learning system (12), so that for example a collision with the object is avoided. The actuator can for example be a motor of the vehicle (10). Alternatively, the actuator control unit (13) can ascertain a control variable, as a function of the output variable of the classification system (12), that is then used to control the actuator.

In a further exemplary embodiment, the actuator control unit (13) includes an enable system. The enable system decides whether an object, e.g. a detected robot or a detected person, has access to an area as a function of the output variable of the machine learning system (12). Preferably, the actuator can be controlled as a function of a decision of the enable system. In addition, the vehicle (10) includes a computing unit (14) and a machine-readable storage element (15).

On the storage element (15) there can be stored a computer program that includes commands that, when the commands are carried out on the computing unit (14), cause the computing unit (14) to carry out the method according to the present invention. It is also conceivable that a download product or an artificially generated signal, each of which may include the computer program, can cause the computing unit (14) to carry out the method according to the present invention after being received at a receiver of the vehicle (10).

In a further specific embodiment, the classification system (12) is used in a measurement system that is not shown in the Figures. The measurement system differs from the robot shown in FIG. 1 in that the measurement system does not include an actuator control unit (13). The measurement system can store the output variable of the classification system (12) or can represent it, for example by visual or auditory representations, instead of forwarding it to the actuator control unit (13).

In addition, the classification system (12) can be used for a tool or a machine tool. The potential object can be a workpiece whose material is classified by the classification system (12). Here, the actuator can be for example a motor that drives a grinding head.

It is also possible that, in a further development of the measurement system, the acquisition unit (11) acquires an image of a human or animal body, or a part thereof. For example, this can be done using an optical signal or an ultrasound signal, or using an MRT/CT method. In this further development, the measurement system can include a machine learning system that is trained so as to output a classification as a function of the input variable, e.g., indicating a clinical picture that may be present on the basis of this input variable.

Figure 2:
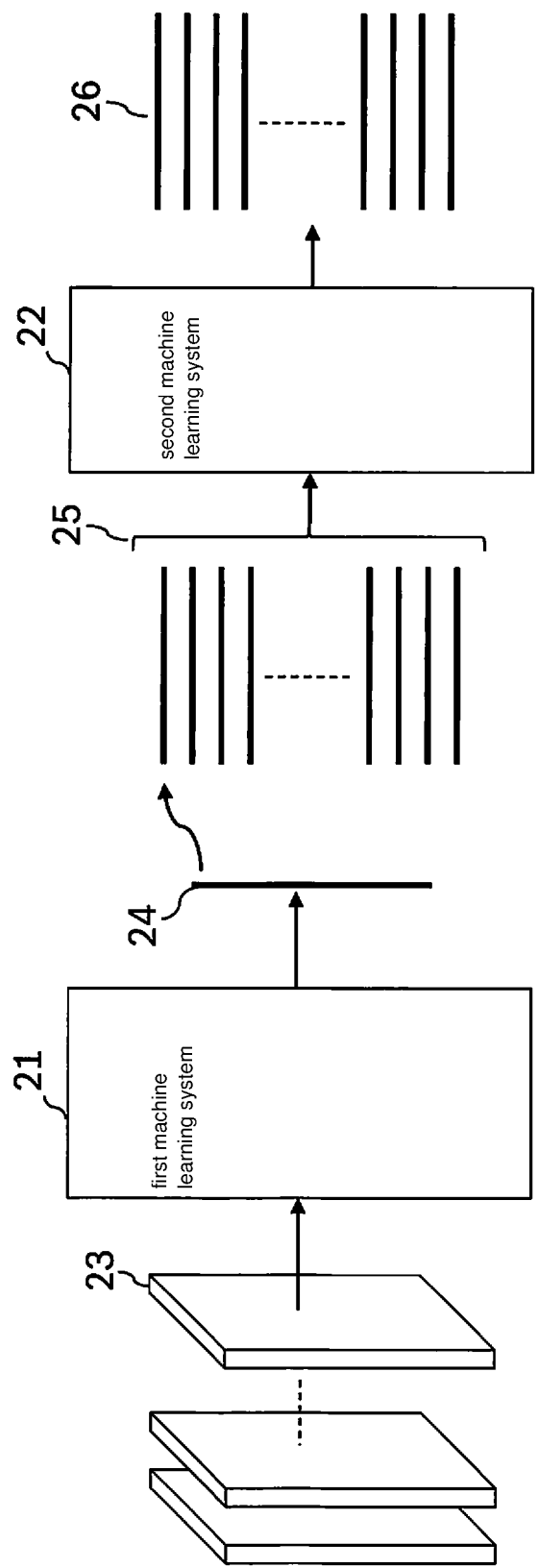
FIG. 2 shows a schematic representation of a first and second machine learning system.

The two machine learning systems (21, 22) of the classification system (12) and their interaction are shown as an example in FIG. 2. The first machine learning system (21) obtains a sequence of images (23). The images (23) can for example be camera images of a surrounding environment of the vehicle (10), e.g., within which a potential object is detected. The first machine learning system (21) then ascertains a respective output variable (24) as a function of each image (23). The output variable (24) characterizes the potential object, in particular classifies the object in one of a plurality of specifiable classes. If the sequence contains for example 50 images (23), then the first machine learning system (21) ascertains 50 output variables (24) one after the other. Preferably, the first machine learning system (21) includes a convolutional deep neural network and has been trained in such a way that the ascertained output variables (24) characterize the potential object.

A second machine learning system (22) then ascertains at least one second output variable (26) as a function of an input variable (25) of the second machine learning system (22). The second output variable (26) also characterizes the potential object. The input variable (25) of the second machine learning system (22) includes a plurality of the output variables (24) of the first machine learning system (21). For example, the input variable (25) can include 30 of the 50 output variables (24) that were ascertained one after the other. Each of the output variables (25, 26) can be a feature vector whose number of entries is the same as the number of different possible classes to which the possible object can be assigned.

In a specific embodiment shown in FIG. 2, the first machine learning system (21) includes the convolutional neural network and the second machine learning system (22) includes a fully meshed deep neural network. In this specific embodiment, the fully meshed neural network ascertains at least one second output variable (26) as a function of all provided output variables (24) of the first machine learning system (21). For example, if the sequence includes 50 images (23) and the first machine learning system (21) has ascertained 50 output variables (21), then the second machine learning system (22) is given these 50 output variables (24) as input variable (25) and ascertains at least one output variable (26) as a function of this input variable (25).

In an alternative specific embodiment shown in FIG. 2, the second machine learning system (22) includes a recurrent neural network. In this specific embodiment, the recurrent neural network ascertains at least one second output variable (26) as a function of each ascertained output variable (24) of the first machine learning system (21). If the sequence includes 50 images (23) and the first machine learning system (21) has ascertained 50 output variables (24), then the second machine learning system (22) ascertains a respective second output variable (26) one after the other as a function of each ascertained output variable (24). It is therefore conceivable that as soon as the first machine learning system (21) has ascertained an output variable (24), this output variable (24) is then used by the second machine learning system (22) to ascertain the second output variable (26). Optionally, the 50 ascertained second output variables (26) can be stored in order to ascertain the confidence level as a function of these output variables.

The recurrent neural network is preferably a Recurrent-Weighted-Average (RWA) model, or alternatively is a Long Short-Term Memory (LSTM) or a Gated-Recurrent-Unit (GRU) model.

Figure 3:
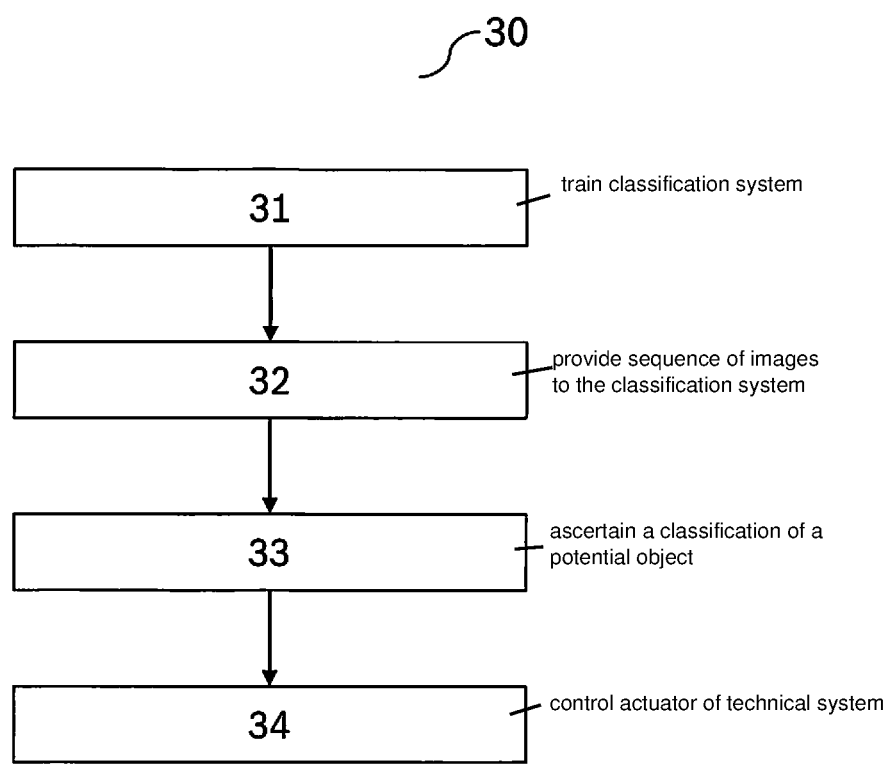
FIG. 3 shows a schematic representation of a specific embodiment of a method for operating a technical system.

FIG. 3 shows a schematic representation of an example method (30) for operating a technical system, for example of the vehicle (10). It should be noted that the method (30) can also be used to operate the measurement system. For this purpose, it has to be taken into account that the measurement system handles the output variable of the classification system (12) differently, and this has to be correspondingly taken into account in the following method (30), described as an example.

The method (30) begins with step 31. In step 31, the classification system (12) is trained. The training of the classification system (12) can be carried out in such a way that parameters of the machine learning systems (21, 22) of the classification system (12) are ascertained as a function of labeled training data and using a cost function and a gradient decrease method, so that the classification system (12) classifies a potential object as a function of an acquired image. In an alternative specific embodiment of step 31, the first machine learning system (21) can be trained independent of the second machine learning system (22). In this specific embodiment, the parameters of the machine learning system are ascertained separately from one another during the training. For example, first the parameters of the first machine learning system (21) are ascertained and subsequently the parameters of the second machine learning system are ascertained, as a function of respectively different cost functions. Alternatively or in addition, the two machine learning systems (21, 22) can also be trained together, i.e., the parameters of the two machine learning systems (21, 22) are ascertained as a function of one another in order to calibrate the machine learning systems (21, 22) to one another, for example using an overall cost function. The overall cost function can be defined via an additive linking of the respective cost functions of the machine learning systems (21, 22).

After step 31 has concluded, step 32 follows. In step 32, a sequence of images (23) is provided to the classification system (12). The sequence of images (21) may have been acquired for example by the acquisition unit (11).

In the following step 33, the classification system (12) ascertains a classification of the potential object, or alternatively an output variable that characterizes the potential object. For this purpose, first the first machine learning system (21) ascertains an output variable (24) that characterizes the potential object as a function of each image (23). Subsequently, at least one second output variable (26) is ascertained by the second machine learning system (22) as a function of a plurality of the output variables (24) of the first machine learning system (21). When a plurality of second output variables (26) have been ascertained, a confidence level can be ascertained as a function thereof. Given a confidence level that exceeds a specifiable threshold, the potential object can be assigned to a class as a function of the ascertained second output variables (26). Alternatively, the potential object can also be assigned to a class if the potential object is assigned to the same class multiple times in a row as a function of the second output variable (26).

After step 33 there follows step 34. In this step, an actuator of the technical system is controlled as a function of the second output variable (26) of the second machine learning system (22). Alternatively, in step 34, as a function of the second output variable (26) a control variable can be ascertained that is then used to control for example an actuator of the vehicle (10). This actuator can be controlled in such a way that the vehicle (10) does not collide with the object in the surrounding environment.

With this, the method (30) ends. In an additional or alternative specific embodiment, the method (30) can be carried out again with step 32 or 33; optionally, the steps can be repeated multiple times in succession until a specifiable abortion criterion is met.

What is claimed is:

1. A method for operating a technical system, comprising:
providing a plurality of images, acquired one after the other in a temporal sequence, of a space surrounding the technical system within which a potential object is situated;
ascertaining, using a first machine learning system, a plurality of first variables that characterize the potential object as a function of each of the images;
ascertaining, using a second machine learning system, at least one second variable that characterizes the potential object as a function of at least two of the first variables characterizing the potential object; and
ascertaining a control variable, as a function of the second variable characterizing the potential object, for controlling an actuator of the technical system;
wherein:
(a) the ascertaining of the at least one second variable is performed by the second machine learning system based on a combination of the at least two of the first variables and the temporal sequence of the plurality of images from which the at least two of the first variables were ascertained, the at least two of the first variables having been ascertained based on two or more of the plurality of images; and/or
(b) the method further comprises ascertaining a confidence level of the at least two of the first variables based on the at least one second variable, and determining, based on the confidence level, whether to obtain further first variables using the first machine learning system in order to characterize the potential object.

2. The method as recited in claim 1, wherein the technical system is a robot, an at least partly autonomous vehicle, a tool, or a machine tool.

3. The method as recited in claim 1, wherein the first machine learning system includes at least one convolutional neural network, and the second machine learning system includes at least one recurrent deep neural network, the second machine learning system ascertaining, one after the other, at least one second variable characterizing the potential object, in each case as a function of at least one of the first variables characterizing the potential object of the plurality of the first variables characterizing the potential object.

4. The method as recited in claim 1, wherein the first machine learning system includes at least a convolutional neural network and the second machine learning system includes at least one further deep neural network, the at least one further deep neural network being a fully meshed or convolutional neural network, the second machine learning system ascertaining the second characterizing variable at least once as a function of a multiplicity of the first variables characterizing the potential object.

5. A method for operating a technical system, the method comprising:
providing a plurality of images, acquired temporally one after the other, of a space surrounding the technical system and within which a potential object is situated;
ascertaining, using a first machine learning system, a plurality of first variables that characterize the potential object as a function of each of the images;
ascertaining, using a second machine learning system, at least one second variable that characterizes the potential object as a function of at least two of the first variables characterizing the potential object; and
ascertaining a control variable, as a function of the second variable characterizing the potential object, for controlling an actuator of the technical system;
wherein:
the first machine learning system includes a convolutional neural network;
the second machine learning system includes a deep neural network, which is a fully meshed or convolutional neural network;
the second machine learning system is configured to ascertain the at least one second variable at least once as a function of a multiplicity of the first variables characterizing the potential object;
a specifiable time is assigned to each of the images acquired temporally one after the other;
each respective one of the first variables characterizing the potential object is assigned the time that is assigned to the image as a function of which the respective first variable characterizing the potential object is ascertained; and
the first variables characterizing the potential object are sorted according to their respective assigned times.

6. A method for operating a technical system, the method comprising:
providing a plurality of images, acquired temporally one after the other, of a space surrounding the technical system within which a potential object is situated;
ascertaining, using a first machine learning system, a plurality of first variables that characterize the potential object as a function of each of the images;
ascertaining, using a second machine learning system, at least one second variable that characterizes the potential object as a function of at least two of the first variables characterizing the potential object; and
ascertaining a control variable, as a function of the second variable characterizing the potential object, for controlling an actuator of the technical system;
wherein:
the first variables characterizing the potential object are each ascertained as a function of a respective segment of the images, respectively, the segment containing the potential object, the segments each being scaled to a standardized segment that has at least one specifiable dimensions;
a movement of the potential object is tracked; and
the segments are ascertained as a function of the movement of the object.

7. The method as recited in claim 1, wherein the first machine learning system and the second machine learning system are trained in such a way that each of the first and second variables characterizing the potential object classifies the potential object.

8. The method as recited in claim 7, wherein the first machine learning system and the second machine learning system are trained independently of one another during the training, the first and second machine learning systems being trained as a function of one another after the first machine learning system and the second machine learning system have been trained.

9. A non-transitory machine-readable storage element on which is stored a computer program for operating a technical system, the computer program, when executed by a computer, causing the computer to perform a method, the method comprising:

providing a plurality of images, acquired one after the other in a temporal sequence, of a space surrounding the technical system within which a potential object is situated;

ascertaining, using a first machine learning system, a plurality of first variables that characterize the potential object as a function of each of the images;

ascertaining, using a second machine learning system, at least one second variable that characterizes the potential object as a function of at least two of the first variables characterizing the potential object; and ascertaining a control variable, as a function of the second variable characterizing the potential object, for controlling an actuator of the technical system;

wherein:
(a) the ascertaining of the at least one second variable is performed by the second machine learning system based on a combination of the at least two of the first variables and the temporal sequence of the plurality of images from which the at least two of the first variables were ascertained, the at least two of the first variables having been ascertained based on two or more of the plurality of images;
(b) the method further comprises ascertaining a confidence level of the at least two of the first variables based on the at least one second variable, and determining, based on the confidence level, whether to obtain further first variables using the first machine learning system in order to characterize the potential object;
(c) the first machine learning system includes a convolutional neural network, the second machine learning system includes a fully meshed or convolutional deep neural network, the second machine learning system is configured to ascertain the at least one second variable at least once as a function of a multiplicity of the first variables characterizing the potential object, a specifiable time is assigned to each of the images acquired temporally one after the other, each respective one of the first variables characterizing the potential object is assigned the time that is assigned to the image as a function of which the respective first variable characterizing the potential object is ascertained, and the first variables characterizing the potential object are sorted according to their respective assigned times; and/or
(d) the first variables characterizing the potential object are each ascertained as a function of a respective segment of the images, respectively, the segment containing the potential object and being scaled to a standardized segment that has at least one specifiable dimension, a movement of the potential object is tracked, and the segments are ascertained as a function of the movement of the object.

10. A device for operating a technical system, the device configured to perform a method, the comprising:

providing a plurality of images, acquired one after the other in a temporal sequence, of a space surrounding the technical system within which a potential object is situated;

ascertaining, using a first machine learning system, a plurality of first variables that characterize the potential object as a function of each of the images;

ascertaining, using a second machine learning system, at least one second variable that characterizes the potential object as a function of at least two of the first variables characterizing the potential object; and ascertaining a control variable, as a function of the second variable characterizing the potential object, for controlling an actuator of the technical system;

wherein:
(a) the ascertaining of the at least one second variable is performed by the second machine learning system based on a combination of the at least two of the first variables and the temporal sequence of the plurality of images from which the at least two of the first variables were ascertained, the at least two of the first variables having been ascertained based on two or more of the plurality of images;
(b) the method further comprises ascertaining a confidence level of the at least two of the first variables based on the at least one second variable, and determining, based on the confidence level, whether to obtain further first variables using the first machine learning system in order to characterize the potential object;
(c) the first machine learning system includes a convolutional neural network, the second machine learning system includes a fully meshed or convolutional deep neural network, the second machine learning system is configured to ascertain the at least one second variable at least once as a function of a multiplicity of the first variables characterizing the potential object, a specifiable time is assigned to each of the images acquired temporally one after the other, each respective one of the first variables characterizing the potential object is assigned the time that is assigned to the image as a function of which the respective first variable characterizing the potential object is ascertained, and the first variables characterizing the potential object are sorted according to their respective assigned times; and/or
(d) the first variables characterizing the potential object are each ascertained as a function of a respective segment of the images, respectively, the segment containing the potential object and being scaled to a standardized segment that has at least one specifiable dimension, a movement of the potential object is tracked, and the segments are ascertained as a function of the movement of the object.

* * * * *